United States Patent [19]

Mansukhani

[11] 4,258,367
[45] Mar. 24, 1981

[54] LIGHT SENSITIVE JET INKS
[75] Inventor: Ishwar R. Mansukhani, Neenah, Wis.
[73] Assignee: Whittaker Corporation, Los Angeles, Calif.
[21] Appl. No.: 25,115
[22] Filed: Mar. 29, 1979
[51] Int. Cl.³ .............................................. G01D 15/18
[52] U.S. Cl. ........................................ 346/1.1; 346/75
[58] Field of Search .......................... 346/1, 75, 140 R

[56] References Cited
U.S. PATENT DOCUMENTS 3,982,251  9/1976  Hochberg .................... 346/140 R X
4,095,233  6/1978  Goffe ..................................... 346/75

Primary Examiner—George H. Miller, Jr.
Attorney, Agent, or Firm—Henry M. Bissell; Donald E. Nist

[57] ABSTRACT

Light sensitive ink compositions suitable for ink jet printing on metal, plastic, or paper surfaces, the ink characterized by opaque properties in light, incorporating in solution, at least one diazo derivative and at least one solvent.

According to another of its aspects, this invention is a process for information recording comprising producing a fine jet of liquid containing at least one diazo derivative, directing said jet of liquid onto a recording medium, modulating the density of said applied jet by an electric field in accordance with the information to be recorded, thereby recording said information, and thereafter applying ultraviolet light to said recording medium bearing said recorded information, thereby rendering said recording opaque.

10 Claims, No Drawings

LIGHT SENSITIVE JET INKS

BACKGROUND OF THE INVENTION

This invention relates to inks characterized by light sensitive properties. In the manufacture of litho plates, etching microcircuits, or engraving a cylinder it is necessary to use a light sensitive coating, expose it through a photographic negative or positive to obtain the desired picture or words. Applying a light sensitive coating by jet printer eliminates the need for the photographic negative or positive.

Ink jet printing is a recent development in the art of applying identifying and decorative indicia to a base. In general terms, a fluid ink is forced, under pressure, through a very small orifice in an orifice block which contains a piezoelectric crystal vibrating at high frequency (50–100,000 vibrations per second) causing the ink passing through the orifice to be broken into minute droplets equal in number to the crystal vibrations. The minute droplets are passed through a charging area where individual droplets receive an electrical charge in response to a video signal, the amplitude of the charge being dependent on the amplitude of the video signal. The droplets then pass through an electrical field of fixed intensity, causing a varied deflection of the individual droplets dependent on the intensity of the charge associated therewith, after which the deflected drops are allowed to impinge to the base medium which is to receive the decorative or informative printed indicia. Apparatus suitable for carrying out the ink jet printing process is described in detail in U.S. Pat. Nos. 3,465,350 and 3,465,351, issued Sept. 2, 1969 and it is in connection with an apparatus and process such as are described in the aforementioned patents that the ink of the present invention is designed to function.

In order to operate satisfactorily in an ink jet printing system, an ink must display a consistent drop breakup length, drop velocity and drop charge under set operating conditions.

It has been determined that on ink jet printer, described in U.S. Pat. Nos. 3,465,350 and 3,465,351, inks with viscosity of 25 cps. will perform satisfactorily depending upon the type of nozzle used. However, inks with lower viscosities perform much better. Resistivity of ink may range as high as 10,000 ohm cm. for satisfactory operations.

DESCRIPTION OF THE INVENTION

This invention is a process for information recording comprising producing a fine jet of liquid, directing a jet of liquid containing a diazo derivative onto a recording medium, modulating the density of the applied jet by an electric field in accordance with the information to be recorded, thereby recording said information, applying ultraviolet light to said recorded information, thereafter rendering said recorded information opaque.

According to another of its aspects, this invention is a process for information recording comprising producing a fine jet of liquid containing at least one diazonium compound or derivative, directing said jet of liquid onto a recording medium, modulating the density of said applied jet by an electric field in accordance with the information to be recorded, thereby recording said information, and thereafter applying ultraviolet light ambient to said recorded information, thereby rendering said recording opaque.

The process comprises the application of a light-sensitive diazo-salt composition to a carrier or base which may be paper or transparent film, such as cellulose acetate or a plastic-coated base support. In the dry development or two-component process, the sensitizing composition comprises a diazo compound, a coupling component or color former, and an acidic coupling inhibitor. In diazo reproduction, the sensitized base is exposed to ultraviolet light. The diazo is decomposed by the light. Development to obtain an azo dye image is accomplished by placing the exposed material in an alkaline atmosphere which neutralizes the acidic inhibitor, allowing the undecomposed diazo and coupler to react.

In sensitizing formulations, the diazos are usually in the form of stabilized compounds of acidic salts such as zinc chloride, cadmium chloride, stannic chloride, and boron trifluoride. These salts are used to stabilize the diazo and also to enhance the keeping quality or shelf life of the sensitized diazotype material. It is also the general practice to provide some means of inhibiting print discoloration and image fading. To achieve this end, various additives are generally used in diazo formulations, such as thiourea, thiourea derivatives and other similarly-acting compounds. Zinc chloride is also generally used as an additive in diazo formulations to further improve the shelf life of the diazotype materials.

Notwithstanding the use of various stabilizers and additives in diazotype formulations, stability or shelf life characteristics of diazotype materials have not been entirely satisfactory, particularly in diazotype materials sensitized with formulations employing diazos noted for their high coupling activity and/or instability.

The preferred photosensitive aromatic diazonium salts of complex halogenides, which decompose upon application of energy are of the formula:
ArNX in which X represents the anion capable of producing stable diazo compounds such as $Cl^-$, $SO_4^{--}$, $ZnCl_4^{--}$, $SnCl_6^{--}$, and $CdCl_4^{--}$.

The aromatic diazonium cation may be represented generally as $[Ar-N^+\equiv N]$, where the aryl group Ar, which may be an alkaryl hydrocarbon group, is bonded to the diazonium group by replacing one of the hydrogen atoms on a carbon atom of the aromatic nucleus, and where the aryl group ordinarily carries at least one amino substituent. Other substituents such as alkyl, alkoxy, etc. may also be present. The complex halogenide anion may be represented by $[MX_{n+m}]^{-m}$. Thus, the photosensitive salt and its decomposition upon actinic irradiation may be depicted as follows:

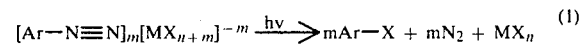

$$[Ar-N\equiv N]_m[MX_{n+m}]^{-m} \xrightarrow{h\nu} mAr-X + mN_2 + MX_n \quad (1)$$

where X is the halogen ligand of the complex halogenide, M is the metallic or metalloid central atom thereof, m is the net charge on the complex halogenide ion, and n is the number of halogen atoms in the halide Lewis acid compound released. The Lewis acid halide $MX_n$ is an electron pair acceptor, such as $FeCl_3$, $SnCl_4$, $PF_5$, $AsF_5$, $SbF_5$, $BF_3$, and $BiCl_3$, etc. which upon suitable irradiation of the diazonium complex salt is released in substantial quantities.

The diazonium compounds of the present invention may be prepared using procedures known in the art.

Illustrative of the aromatic diazonium cations comprised in the photosensitive catalyst salts utilized in accordance with the present invention are the following:

2-chloro-4-(dimethylamino)-5-methoxybenzenediazonium
p-morpholinobenzenediazonium
2,5-dichloro-4-morpholinobenzenediazonium
2,5-dimethoxy-4-morpholinobenzenediazonium
4-(dimethylamino)-naphthalenediazonium Illustrative of the complex halogenide anions comprised in the photosensitive catalyst salts utilized in accordance with the present invention are the following:

tetrachloroferrate (III), $FeCl_4^-$
hexachlorostannate (IV), $SnCl_6^{--}$
tetrafluoroborate, $BF_4^-$
hexafluorophosphate, $PF_6^-$
hexafluoroarsenate (V), $AsF_6^-$
hexafluoroantimonate (V), $SbF_6^-$
pentachlorobismuthate (III), $BiCl_5^{--}$ The source of radiation for carrying out the method of the present invention can be any suitable source, such as the ultraviolet actinic radiation produced from a mercury, xenon, or carbon arc, or the electron beam produced in a suitably evacuated cathode ray gun. The only limitation placed on the radiation source used is that it must have an energy level at the irradiated film sufficient to impart to the system energy at an intensity high enough to reach the decomposition level of the photosensitive compounds. As previously noted, the wavelength (frequency) range of actinic radiation is chosen to obtain sufficient absorption of energy to excite the desired decomposition.

Depending upon type of substrate on which ink is to be printed, it is advantageous to use a solvent which will penetrate the wax or other coating on substrates to enhance adhesion and rub resistance of the ink.

The jet ink in accordance with this invention, which contains an aliphatic monovalent alcohol, is easily deflected. Typical aliphatic monovalent alcohols are methyl alcohol, ethyl alcohol, n-propyl alcohol, isopropyl alcohol, n-butyl alcohol, sec-butyl alcohol, tert-butyl alcohol, isobutyl alcohol, n-amyl alcohol, amyl alcohol, isoamyl alcohol, hexyl alcohol, heptyl alcohol, octyl alcohol, or a mixture of same. Aliphatic monovalent alcohols with 1 to 8 carbon atoms are particularly preferred. The weight ratio of aliphatic monovalent alcohol to other solvents is preferably 1–99:99–1, especially 30–80:70–20, and particularly 40–80:60–20.

Solvents which form the mixture for these inks are ketones, aldehydes, ethers, esters, hydrocarbons, glycol, glycol ethers and lactones.

Suitable solvents are hydrocarbons, such as hexane, heptane, octane, decane, cyclopentane, cyclohexane, benzene, toluol, xylol, and ethylbenzene; hydrocarbon halides, such as carbon tetrachloride, ethylene dichloride, trichloroethylene, tetrachloroethane, and dichlorobenzene; ether-type solvents, such as butyl ether, ethylene glycol-diethyl ether, ethylene glycol-monoethyl ether, ethylene glycol-monobutyl ether; ketone-type solvents, such as acetone, methylethyl ketone, methyl propyl ketone, methyl isobutyl ketone, methylamyl ketone, cyclohexanone; ester-type solvents, such as ethyl formate, methyl acetate, propyl acetate, butyl acetate, phenyl acetate, ethylene glycol-monoethyl ether acetate, methylpropionate; other alcohol solvents, such as diacetone alcohol or such.

The invention is described in the following on the basis of an exemplified embodiment.

While there is disclosed below but one embodiment of the invention herein presented, it is possible to produce still other embodiments without departing from the inventive concepts herein disclosed. Various other modifications will be readily apparent to those skilled in the art.

EXAMPLE 1

| | |
|---|---:|
| * Diazo litho negative S-11-A | 1.50 |
| distilled water | 40.50 |
| methanol | 58.00 |
| | 100.00 |

*PHILLIPHUNT COMPANY

After printing with light sensitive jet ink, one exposes it with light and can develop litho plates by applying any wipe on lacquer developer.

Various other examples and modifications of the ink compositions of this invention might be cited or will suggest themselves to those skilled in the art, and it is intended that the scope of the invention be limited only as necessitated by the appended claims.

What is claimed is:

1. A process for information recording comprising producing a fine jet of liquid containing a diazo light sensitive material, modulating the charge density of the jet by applying an electric field in accordance with the information to be recorded, directing the jet of liquid to a recording medium to record said informtion, and thereafter subjecting said recorded information to ultraviolet light, thereby rendering the information visible.

2. The process of claim 1 wherein the recorded information is subjected to ultraviolet light for from 1 to 95 seconds.

3. The process of claim 1 wherein the recorded information is exposed to an alkaline atmosphere after application of ultraviolet light.

4. The process of claim 1 wherein the liquid exhibits a viscosity of up to 25 cps. and a resistivity of under 10,000 ohm-cm.

5. A visibly colorless ink composition suitable for use in jet printing operations consisting essentially of a solution of the following components:
   a. a visibly colorless diazo containing composition which decomposes to form a visible material in ultraviolet light, said diazo composition being present in an amount below about 90 weight percent, and
   b. at least one solvent whereby the ink exhibits a viscosity of up to 25 cps. and exhibits a resistivity of up to 10,000 ohm-cm.

6. The composition of claim 5 wherein the colorless composition is a composition containing a diazo component, a coupling component and an acidic coupling inhibitor.

7. The composition of claim 5 wherein the diazo component has the formula ArNX, in which X represents a stabilizing anion, and Ar is selected from the group consisting of aryl, alkaryl and substituted ary and alkaryl substituents.

8. The composition of claim 7 containing a Lewis acid in the diazo component.

9. The composition of claim 5 wherein the solvent comprises a mixture of from 30 to 80% by weight of an aliphatic monovalent alcohol of from 1 to 8 carbon atoms and from 20 to 70% of a member selected from the group consisting of ketones, aldehydes, ethers, esters, hydrocarbons, glycols, glycol ethers, lactones and mixtures thereof.

10. The composition of claim 9 wherein the alcohol is present in a range of from 40 to 80% and the other solvent is present in a range of from 20 to 60%.

* * * * *